(12) United States Patent
Heidari

(10) Patent No.: US 6,711,413 B1
(45) Date of Patent: Mar. 23, 2004

(54) APPARATUS, AND ASSOCIATED METHOD, BY WHICH TO DETECT PAGING MESSAGES AT A MOBILE STATION

(75) Inventor: Ghobad Heidari, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/265,764

(22) Filed: Mar. 10, 1999

(51) Int. Cl.$^7$ ............... H04Q 7/00; H04Q 7/20; H04B 7/212; H04M 1/00
(52) U.S. Cl. .......... 455/515; 455/426.1; 455/425; 455/434; 455/550; 370/314; 370/313; 370/321; 370/352; 370/347
(58) Field of Search ............... 370/314, 313, 370/321, 352, 347; 455/55.01, 343, 434, 515, 552, 516, 517, 524, 525, 412.1, 422.1, 425, 426.1

(56) References Cited

U.S. PATENT DOCUMENTS

| | | | | |
|---|---|---|---|---|
| 5,263,195 A | | 11/1993 | Panther et al. ............ | 455/316 |
| 5,481,254 A | * | 1/1996 | Gaskill et al. ............ | 340/825.52 |
| 5,699,364 A | | 12/1997 | Sato et al. ............... | 371/5.5 |
| 5,799,256 A | * | 8/1998 | Pombo et al. ............. | 455/574 |
| 5,930,706 A | * | 7/1999 | Raith ...................... | 455/422 |
| 6,138,001 A | * | 10/2000 | Nakamura et al. ......... | 455/343 |
| 6,198,748 B1 | * | 3/2001 | Bruckert .................. | 370/432 |
| 6,216,004 B1 | * | 4/2001 | Tiedemann, Jr. et al. ... | 455/442 |
| 6,307,846 B1 | * | 10/2001 | Willey ..................... | 370/329 |

* cited by examiner

Primary Examiner—William Trost
Assistant Examiner—Meless Zewdu
(74) Attorney, Agent, or Firm—Milan T. Patel (57) ABSTRACT

Apparatus, and an associated method, for operating a mobile station to receive paging messages broadcast thereto. Determination of operating characteristics, such as noise levels or fading levels, are made. Responsive to such determinations, selection is made either to cause operation of the mobile station responsive to page indication bits broadcast upon a quick-paging channel (F-QPCH), or to merely monitor the paging channel in conventional manner.

21 Claims, 4 Drawing Sheets

APPARATUS, AND ASSOCIATED METHOD, BY WHICH TO DETECT PAGING MESSAGES AT A MOBILE STATION

The present invention relates generally to paging of a receiving station, such as a mobile station operable in a cdma2000 cellular communication system constructed pursuant to a proposed cdma2000, or other third generation system, to alert the receiving station of a call message to be terminated thereat. More particularly, the present invention relates to apparatus, and an associated method, by which to selectively make use of page indication bits, such as those transmitted during operation of the proposed cdma2000 system. Operation of an embodiment of the present invention improves paging reliability and flexibility as well as permits the levels of power consumption at the receiving station to be reduced.

BACKGROUND OF THE INVENTION

The use of wireless communication systems by which to communicate telephonically has achieved wide levels of usage in recent years. Advancements in communication technologies have permitted the development, and popular usage, of new types of communication devices, of improved performance capabilities, of increased portability, and of increased affordability.

In contrast to conventional, wire-line communication systems, a communication channel formed to extend between a sending station and a receiving station in a wireless communication system, is formed of one or more radio channels. A radio channel is defined upon a portion of the electromagnetic frequency spectrum. Information to be communicated by the sending station to the receiving station is converted into a form, typically by way of a modulation process, to permit its communication upon the radio channel. Because of the use of radio channels to effectuate communication between the sending and receiving stations, conventional wire-line connections are not required to be positioned to extend between such sending and receiving stations. The costs associated with the installation of a wireless communication system, as a result, are sometimes less than the costs required to install a wire-line system. Utilization of a wireless communication system is also advantageous in that communication therethrough can be effectuated from locations at which the installation of a wire-line connection would be impractical.

A cellular communication system is exemplary of a wireless, multi-user communication system which has achieved wide levels of usage in recent years. Telephonic communication, of both voice and data messages, is possible by way of a cellular communication system. A conventional cellular communication system includes a network infrastructure, including a plurality of fixed-site base stations installed throughout a geographical area. Telephone communications are effectuated by way of the fixed-site base stations with mobile stations positioned within the geographical area encompassed by the network infrastructure.

Various standards have been promulgated to define the operational requirements of various types of cellular communication systems. Cellular communication systems have been correspondingly constructed to comply with such standards. For instance, the TIA/EIA-95-B interim standard, promulgated by the EIA/TIA, is exemplary of a standard which sets forth operational requirements of a cellular communication system. The TIA/EIA95-B standard is a CDMA (code-division multiple-access) cellular communication system.

In a CDMA system, a plurality of concurrently generated communication signals, such as those generated during operation of a plurality of mobile stations, are transmitted upon a common portion of the electromagnetic spectrum. Each communication signal is uniquely encoded at a sending station, and a channel is defined by the unique code by which a communication signal is encoded. A receiving station uniquely decodes the uniquely encoded communication signal, thereby to recover the informational content thereof. In a multi-user cellular communication system, the concurrently-generated communication signals are generated by the transmitter portions of the radio base stations and mobile stations of the system. And, the receiver portions of such regular base stations and mobile stations are operable to receive, and thereafter decode, such communication signals.

Conventionally, when a message, a "call", is to be terminated at a mobile station, the network infrastructure broadcasts a paging message to alert the mobile station of the message. Responsive to the detection of the page, the mobile station is caused to perform various operations to receive the terminating message. Between calls, portions of the mobile station are usually powered-down to reduce power consumption at the mobile station. By reducing power consumption, the battery life of a battery power supply used to power the mobile station can be increased.

In the TIA/EIA-95-B standard, for instance, a paging channel slot defined upon a paging channel is assigned to a group of mobile stations. When a message is to be terminated at a mobile station, a page is broadcast to the mobile station during the paging channel slot assigned to the mobile station. The mobile "wakes-up" prior to its designed pager slot to receive the message during that slot. The paging channel slot is defined in a manner such that the paging channel slot assigned to a particular mobile station repeats at regular intervals, thereby defining a paging channel slot cycle.

The mobile station must be powered to an extent to permit its detection of a paging message broadcast during the paging channel slot, but, during other times, the mobile station is able to power-down and enter a standby mode, thereby to reduce power consumption of the mobile station. Additional details of the manner by which a mobile station is paged in a cellular communication system constructed pursuant to the TIA/EIA-95-B standard is described in the TIA/EIA-95-B specification, and the contents of which are incorporated herein in their entirety.

Proposals have been set forth for a new third-generation (3G), cellular communication system standard, referred to as the cdma2000 standard. The cdma2000 standard is sometimes also referred to as an IS-95C standard or IS-2000 standard. Proposals set forth in such standard provide for the communication of both voice and data messages. Various of such proposals set forth in the cdma2000 standard provide for the effectuation of communication in more efficient manners than permitted in existing systems.

For instance, the cdma2000 standard provides for a forward link quick-paging channel (F-QPCH) upon which indications, i.e., paging-bits are broadcast to a mobile station when a message is to be terminated at the mobile station. Transmission of the page indication bits permits a mobile station to determine quickly if a paging signal is to be transmitted to the mobile station to alert the mobile station of a terminating message to be terminated thereat. When a page is to be broadcast, a pair of page indication bits are first transmitted to the mobile station to indicate to the mobile station that a paging message is to be broadcast during a subsequent paging channel slot. Thereby, the mobile station is alerted to power-up to detect the subsequently-transmitted page.

In the absence of page indication bits, the mobile station is able to quickly determine that a page shall not be broadcast during a subsequent paging channel slot. The mobile station can power-down, thereby to conserve power. Thereby, power consumption of the mobile station is reduced in the event that no page indication bits are broadcast.

While such mechanism provides the possibility of improved power consumption characteristics of the mobile station, the existing manner by which the mobile station makes use of the page indication bits is strictly construed. Existing mobile station methodology as set forth in the TIA contributions for the cdma2000 standard utilizes a prescribed analysis of the page indication bits. Namely, if the first of a pair of indication bits is of a logical zero value the mobile station powers-down to a standby mode, thereby to ignore a second paging bit of the pair as well as to remain in the standby mode for a subsequent paging channel slot. Conversely, if the first paging bit is of a logical one value, the mobile station must receive the second paging bit prior to determining its subsequent operation. If the second paging bit is also of a logical one value, confirmation is made of the value of the first-detected paging bit. And, the mobile station is caused to power-up to detect and decode the page broadcast on a subsequent paging channel slot. If, conversely, the second paging bit of the pair of page indication bits is of a logical zero value, the mobile station thereafter powers-down to a standby mode and does not remain powered-up during a subsequent paging channel slot.

The existing methodology incorporates inflexible rules which are unpermitting of variation to take into account the varying environmental conditions and changes in system operation.

A manner to permit more flexible use of the page indication bits broadcast on a quick paging channel would facilitate improved operation of the mobile station.

It is in light of this background information related to paging of a radio receiving device that the significant improvements of the present invention have evolved.

SUMMARY OF THE INVENTION

The present invention, accordingly, advantageously provides apparatus, and an associated method, by which to selectively make use of page indication bits, such as the page indication bits defined in the cdma2000 specification, used to alert a mobile station of a page to be broadcast thereto.

Operation of an embodiment of the present invention provides a dynamic manner by which to selectively utilize page indication bits broadcast upon a quick paging channel (F-QPCH) defined in a cdma2000 cellular communication system. Determination is made of the likelihood that the values of the page indication bits are accurate. Responsive to such a determination, selection is made as to the manner, and if, the page indication bits are utilized at the mobile station to facilitate effectuation of paging operations at a mobile station. Operation of an embodiment of the present invention facilitates a reduction in power consumption requirements of a mobile station, as well as also providing for improved paging reliability at the mobile station.

In one implementation, when a determination is made that the operational conditions indicate that the values of the page indication bits, when received at the mobile station, are likely to be accurate, viz., are likely to correspond in value to the values of such page indication bits transmitted by the network infrastructure to the mobile station, only a single one of a pair of page indication bits is utilized by a mobile station to determine whether a page is to be broadcast to the mobile station. Reduced power consumption of the mobile station is thereby permitted as the value of only a single paging bit need be determined to select whether to power-down to a standby mode or to power-up during a subsequent paging channel slot to receive and decode a paging message broadcast thereon.

A determination is made, e.g., of signal quality measures including signal quality levels of the page indication bits responsive to the operating parameter, the power-up schedule of the mobile station due the other (non-page related) factors, the importance level associated with receiving a page, and any user choices relative to the priority of pages versus power conservation.

In another implementation, if a determination is made that communication conditions prevent assurances that a single paging bit is likely to be accurate, the mobile station is caused to be operated to determine values of both page indication bits of a pair of page indication bits and to select whether to maintain the mobile station in a powered-up mode during a subsequent paging channel slot responsive to determination of values of both of the page indication bits. Soft combining, for instance, of the two page indication bits can be performed to determine the values of the page indication bits.

In another implementation, if a determination is made that the values of the page indication bits are not likely to be valid or if the mobile station has other reasons to be powered up during the page slot, the mobile station is caused not to determine values of the page indication bits, and, instead, to tune to the paging channel during the paging channel slot assigned to the mobile station and to determine therefrom whether a paging message is broadcast thereto.

As the operational conditions in which the mobile station is operated is susceptible to change over time, operation of the mobile station is correspondingly caused to change with changing operational conditions. Thereby, a dynamic manner is provided by which to efficiently determine whether a paging message is broadcast to the mobile station, depending upon the operational conditions of the communication system.

In these and other respects, therefore, apparatus, and an associated method is provided by which to operate a radio device in a selected manner to receive paging messages. The radio device is operable in a radio communication system in which paging messages are selectively transmitted to the radio device upon a paging channel slot assigned to the radio device, the paging channel slot being defined upon a paging channel. Page indication bits are transmitted to the radio device at time intervals corresponding to the paging channel slot, and the page indication bits are of values representative of transmission of a paging message upon a paging channel slot. A determiner is coupled to receive indications of an operating parameter of signal conditions related to transmission of the page indication bits to the radio device. The determiner determines signal quality levels of the page indication bits responsive to the operating parameter. A selector is coupled to receive indications of determinations made by the determiner. The selector is operable responsive to the indications of the determinations by the determiner to select the selected manner by which to operate the radio device to receive the paging message.

A more complete appreciation of the present invention and the scope thereof can be obtained from the accompanying drawings which are briefly summarized below, the following detailed description of the presently preferred embodiments of the invention, and the appended claims.

DETAILED DESCRIPTION OF THE PREFERRED EMBODIMENT

Figure 1:
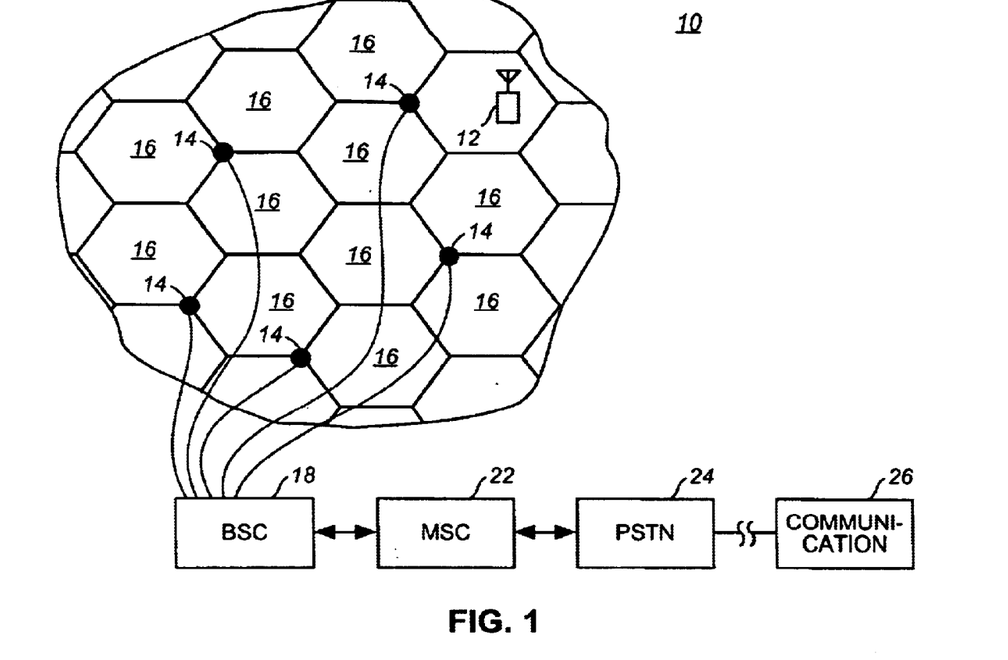
FIG. 1 illustrates a representation of a portion of a cellular communication system containing radio base stations, each capable of communication with a mobile station constructed pursuant to an embodiment of the present invention.

Turning first to FIG. 1, a portion of a cellular communication system, shown generally at 10, provides for wireless communications with mobile stations, of which the mobile station 12 is exemplary. The system 10 includes a plurality of spaced-apart radio base stations 14. In the implementation shown in the Figure, sets of three radio base stations are co-located, each of the co-located base stations defining a separate cell 16. In like manner, other sets of radio base stations 14 also define cells 16, and the cells 16 collectively encompass the geographical area throughout which radio coverage is provided by the cellular communication system 10.

Groups of the radio base stations 14 are coupled to a BSC (base station cotroller) 18. A BSC 18 is operable to control operation of the radio base stations coupled thereto. Groups of BSCs are coupled to an MSC (mobile switching center) 22. An MSC 22 is operable, amongst other things, to perform switching operations. The MSC 22 is coupled to a PSTN (public-switched, telephonic network) 24 and, the PSTN 24 is coupled to communication stations, such as the communication station 26.

Telephonic communications are effectuated between a communication station, such as the communication station 26 and a mobile station, such as the mobile station 12 by forming communication paths between the communication station, through the PSTN 24, the various elements of the network infrastructure of the cellular communication system, and over a radio link formed between the network infrastructure and the mobile station. Because of the radio-channel connection between the mobile station and the network infrastructure, communications can be effectuated with the mobile station without requiring a wire line connection to be formed with the mobile station.

When a call, or other communication message, is to be terminated at i.e., placed to, the mobile station, the mobile station is alerted by way of a page message broadcast by the network infrastructure to be detected by the mobile station. The TIA/EIA-95-B standard sets forth a paging procedure in which a paging channel is defined. Paging messages are broadcast on the paging channel for transmission to the mobile station. And, the cdma2000 standard further defines a manner by which page indication bits are also broadcast to the mobile station to alert a mobile station of a forthcoming paging message which, in turn, alerts the mobile station of a terminating call.

Figure 2:
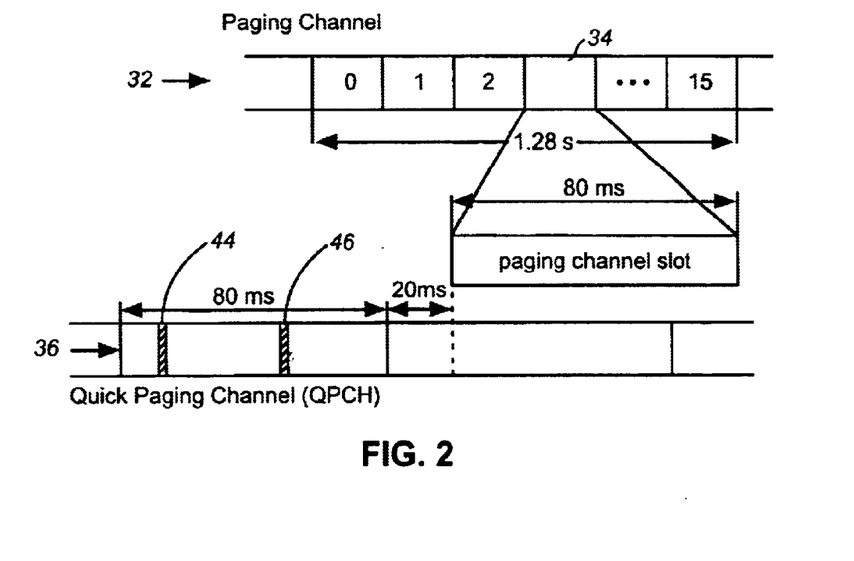
FIG. 2 illustrates a graphical representation of the relationship between page indication bits and a paging channel slot, all as defined in a cdma2000 cellular communication system.

FIG. 2 illustrates the relationship between paging channel slots defined upon a paging channel and page indication bits defined in the cdma2000 cellular communication system. Such illustration is excerpted from the IS-2000.4 standard, the contents of which are incorporated by reference herein. The paging channel, shown generally at 32, at the top portion of the diagram is divided into 80 ms, paging-channel slots 34. During operation, a particular paging-channel slot is assigned to a mobile station, e.g., during 1.28 second assignations.

A mobile-station-assigned quick paging channel 36 is also shown in the figure. The quick paging channel (QPCH) 36 assigned to the mobile station is formed of QPCH slots 38. During operation, a particular QPCH slot 38 is also assigned to a mobile station, for the same time period during which a paging channel slot 34 is assigned to the mobile station, again, e.g., during 1.28 second assignation. The QPCH slots 38 are, however, offset from the paging-channel slots 34 by 100 ms offsets. And, two-page indication bits 44 and 46 in the QPCH slot 38 are assigned to each mobile station. The page indication bits are separated by at least 20 ms separations.

As set forth in an existing proposal for the cdma2000 standard, when the page indication bits 44 are detected at a mobile station, the mobile station is alerted to detect the contents of the paging message broadcast to the mobile station on a subsequent paging channel slot. That is to say, if the mobile station detects energy of page indication bits 44 during a first time period, the mobile station is caused to determine the informational content of a paging message broadcast to a subsequent paging channel slot. While the existing manner by which to make use of the page indication bits 44 utilizes a prescribed scheme, operation of an embodiment of the present invention takes advantage of determinations of operating conditions to more efficiently utilize, or determine not to utilize, the page indication bits.

Figure 3:
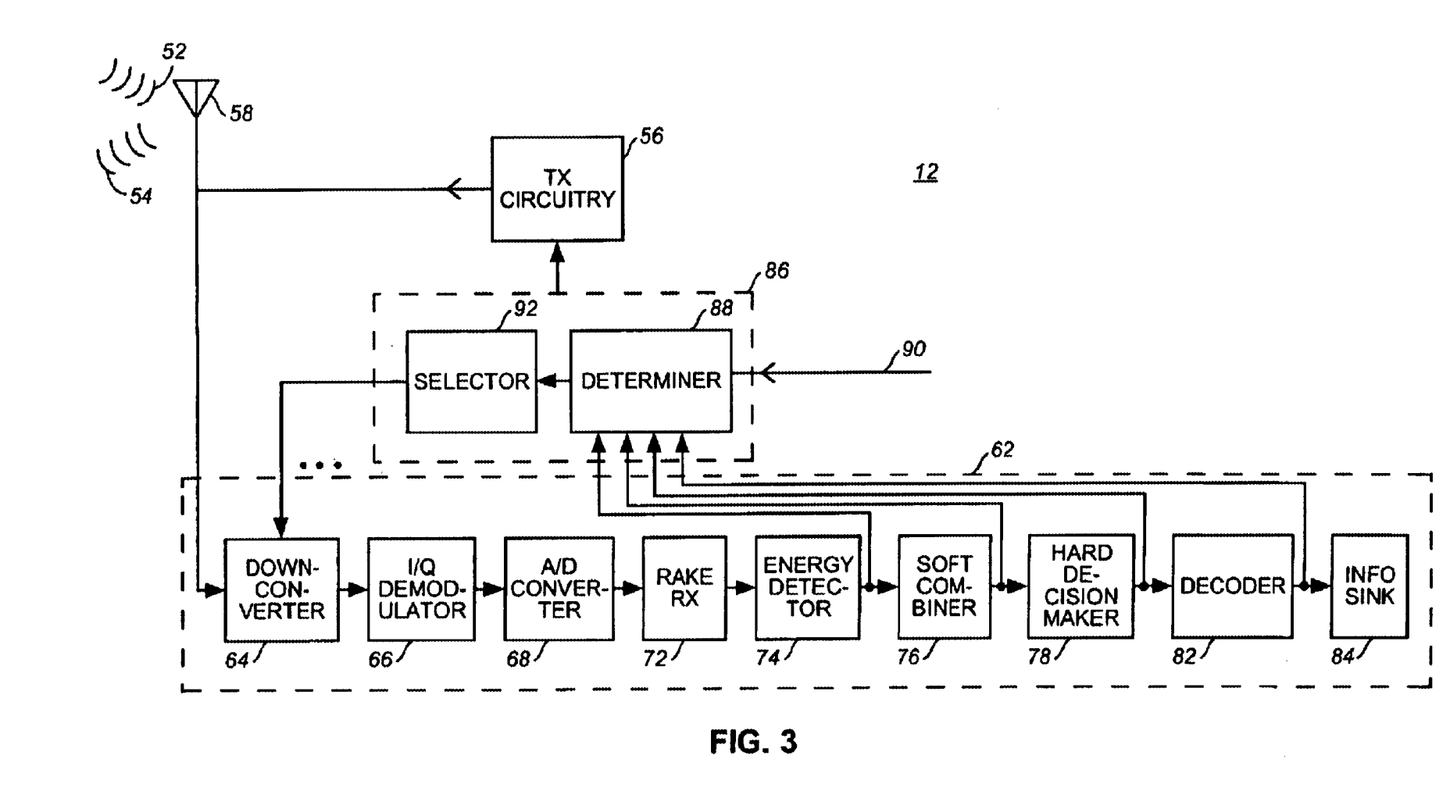
FIG. 3 illustrates a functional block diagram of a mobile station of an embodiment of the present invention.

FIG. 3 illustrates the mobile station 12, shown previously in FIG. 1, here in greater detail. The mobile station 12 is operable pursuant to an embodiment of the present invention.

The mobile station is operable to receive forward-link signals 52 and to transmit reverse-link signals 54. The reverse-link signals are generated by transmitter circuitry 56 of the mobile station and transduced into electromagnetic form by an antenna transducer 58.

The mobile station 12 further includes a receiver portion 62, also coupled to the antenna transducer 58 to receive electrical signals representative of the forward-link signals 52 detected by the antenna transducer 58 and converted into electrical form by the antenna transducer.

The receiver circuitry 62 includes a down-converter 64, formed of one or more down-conversion stages, operable to down-convert in frequency the electrical signals to a base-band level. Down-converted signals formed by the down-converter 64 are provided to an I/Q demodulator 66. Demodulated signals generated by the demodulator 66 are converted into digital form by an A/D (analog-to-digital) converter 68.

Digital values are provided to a rake receiver 72 formed, in conventional manner, of rake fingers (not separately shown) and a symbol combiner (not separately shown). Combined signals formed by the rake receiver are provided to an energy detector 74. Representations of the energy detected by the energy detector 74 are provided to a soft combiner 76, also operable in conventional manner to, e.g., associate confidence levels with the received energy and to provide indications of such combined values to a hard decision maker 78. The soft combiner 76, in one implementation, need not operate upon channels other than the QPCH. Values generated by the hard decision 78 are provided to a decoder 82 which decodes sequences of such values and provides decoded signals to an information sink 84.

The mobile station further includes a controller 86. The controller 86 controls-operation of various elements of the mobile station. The controller 86 is implemented, for example, as a processor having algorithms executable thereat for performing the control functions of the controller. Here, the controller 86 is shown to include a determiner 88 for performing determining functions and a selector 92 for performing selecting functions. The selector is coupled to receive indications determinations made by the determiner. The determiner is here shown to be coupled to receive indications of signals generated by various stages of the receiver portion 62. Determinations are made responsive to values of such signals of various operating parameters associated with the communication system and the mobile station according to various embodiments of the present invention. A line 90 extending to the determiner is representative of information provided thereto in various embodiments of the present invention. Such information is one embodiment, is indicative of information related to a mobile-station power-up schedule. In another embodiment, such information is indicative of historical information related to missed pages. And, in another embodiment such information is indicative of other non-paging operation of the mobile station, such as neighbor cell searching. Such information is also indicative of information received from a base station on power levels of page indication bits.

Through operation of an embodiment of the present invention, the mobile station 12 is provided with more control over the decoding of the page indication bits, such as the page indication bits 44 and 46 shown in FIG. 2, generated on a quick paging channel F-QPCH, as defined in the cdma2000 standard.

For any of various reasons, for instance, noise, interference, collision, or fading, the page indication bits detected by the mobile station may be of values different than their intended values. Conversely, the levels of noise, interference, or fading might be so low that the page indication bits, when detected by the mobile station, are quite likely to correspond to their correct values. Determinations of such conditions can be used to select the manner by which, or if, the page indication bits broadcast on the F-QPCH are utilized at the mobile station. That is to say, in contrast to the originally-proposed manner by which the F-QPCH page indication bits are utilized in the same way for all operating conditions of the communication system, various embodiments of the present invention make use of the F-QPCH page indication bits in different manners.

In operation, the determiner 88 determines a selected operating condition and provides an indication of such determination to the selector 92. The selector, responsive thereto, selects the manner by which the page indication bits are utilized by the mobile station.

If a determination is made by the determiner that, for instance, the fading conditions are so undesirable that the F-QPCH page indication bits are unreliable, the page indication bits are not utilized. In one implementation, the F-QPCH is not even accessed to detect the page indication bits. That is to say, if a determination is made that the page indication bits are unreliable, operation of the mobile station corresponds, generally, to operation of a mobile station without the use of QPCH, such as the slot 34 shown in FIG. 2, assigned to the mobile station is always decoded. A possibility of missing messages on the paging channel as a result of misinterpretation of the values of the page indication bits is avoided. Power consumption of the mobile station, however, corresponds to that of an existing mobile station. When determinations are subsequently made by the determiner that the likelihood of accuracy of the page indication bits is acceptable, use is again made of such page indication bits.

When the determiner determines the operating conditions to be good, monitoring of only a single one of the page indication bits may be sufficient to make a determination of whether a paging message is broadcast to the mobile station on a paging channel slot. Improved power consumption performance of the mobile station is thereby permitted as only a single paging bit need be detected and its value determined.

The determiner is operable, variously pursuant to various embodiments, make determinations of operating conditions such as: the received signal level of signals received at the mobile station, the received pilot $E_c/I_o$, the speed at which the mobile station is moved, the recent history of false alarms, and missed pages, the number of neighbor cells whose signals the mobile station must search, and levels of power consumption of various components of the mobile station, such as the RF front end portion, the base band portion, the VCO (voltage-controlled oscillator) etc., all conventional portions of a mobile station. Responsive to such determinations, selection is made by the selector 92 either to evaluate the page indication bits transmitted upon the F-QPCH in a selected manner, or to ignore such bits. Power consumption levels of the mobile station can thereby be reduced, if possible, and improved mobile station performance can result as missed-page rates can be reduced.

The selector 92 is able to operate dynamically, responsive to changing determinations of the determiner 88. Dynamic adjustment of the manner by which the page indication bits generated on the F-QPCH are interpreted, responsive to determination of varying environmental conditions and system parameters, is possible.

One selection by the selector 92 causes the mobile station to detect and determine the values of both of the page indication bits of a paging bit pair to determine whether a subsequent paging channel slot should be monitored and a message generated thereon decoded. Another selection by the selector causes the mobile station to detect and determine the values of a first one of the page indication bits of a paging bit pair to make a similar determination. Also, selection can be made by the selector 92 to detect and determine the value of a second of the pair of page indication bits to determine whether the mobile station should monitor a subsequent paging channel slot.

Selection is also alternately made by the selector to cause soft-combined pairs of page indication bits to be utilized to determine whether a subsequent paging channel slot should be monitored and a message thereon decoded.

In another implementation, and as noted above, if a determination is made by the determiner 88 which indicates poor signal or other operating conditions, the page indication bits are not monitored and, instead, each paging channel slot is monitored to determine whether a page message is broadcast thereon.

Figure 4A:
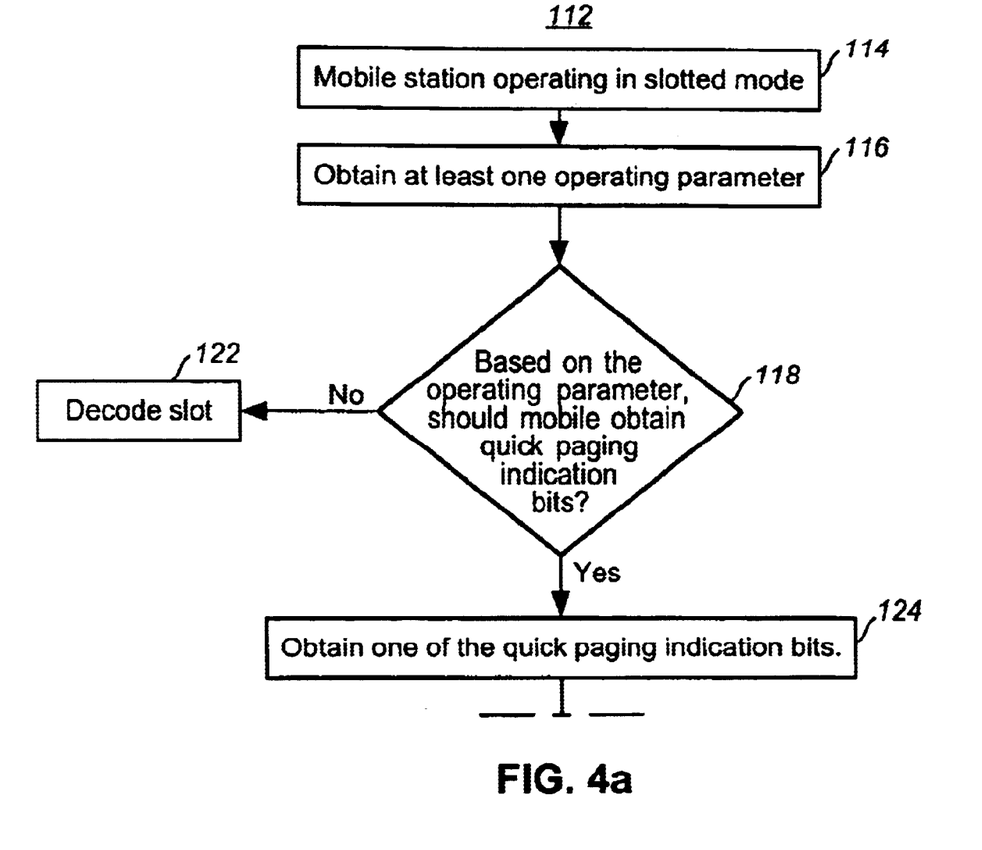
FIG. 4 illustrates a flow chart illustrating operation of the mobile station shown in FIG. 3 according to an embodiment of the present invention.
Figure 4B:
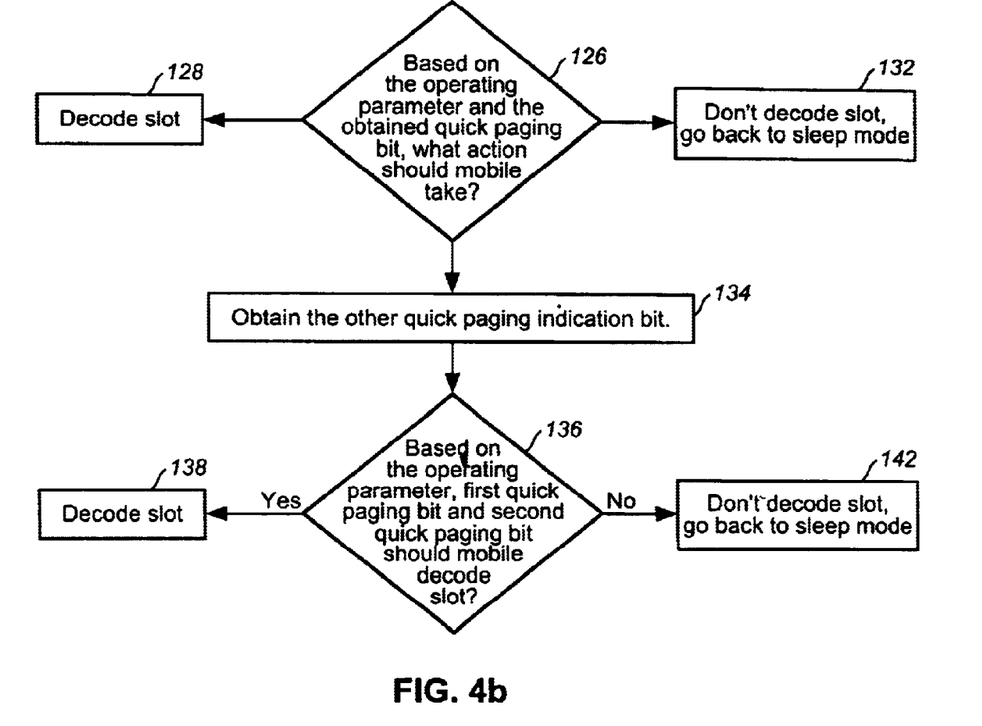

FIG. 4 illustrates a method, shown generally at 112, by which the mobile station 12 (shown in FIG. 3) is operable pursuant to an embodiment of the present invention. The method by which the mobile station is operable is dependent upon determinations of operating conditions of the mobile station and the radio communication system in which the mobile station is operable. Depending upon such determinations, selection is made as to the manner by which, and if, to utilize the page indication bits broadcast by the network infrastructure of a cdma2000 cellular communication system. And, as described above, the network infrastructure broadcasts paging messages to the mobile station to alert the mobile station of a call to be terminated thereat. The paging messages are broadcast to a mobile station during a paging channel slot assigned to the mobile station.

First, and as indicated by the block 114, the mobile station is initially operated in a slotted mode. That is to say, the mobile station is caused to be powered-up during each paging channel slot assigned to the mobile station in order to detect the paging message communicated thereon. In between any two consecutive paging channel slots, the mobile station can power down to its "sleep mode". Then, as indicated by the block 1 16, at least one operating parameter is determined by the mobile station. In the exemplary implementation, the determiner 88 of the controller 86 of the mobile station 12 (shown in FIG. 3) makes a determination of an operating characteristic of the communication system in which the mobile station is operable.

Then, as indicated by the decision block 118, a determination is made, based upon the determined operating parameter, whether the mobile station should make use of the page indication bits, such as those transmitted on the F-QPCH. In one implementation, the determination is made during every slot cycle. If not, such as when operating conditions in which the mobile station is operated are poor and the likelihood of correct detection of the values of the page indication bits is not assured, the no-branch is taken to the block 122. At the block 122, the mobile station is operated in conventional manner to be powered-up to monitor the next paging channel slot assigned to the mobile station. If, conversely, a determination is made at the decision block 118 that detection and determination of the value of a paging bit would likely be accurate, the yes branch is taken to the block 124 whereat the mobile station is caused to monitor the quick-paging channel for transmission of a paging bit thereto.

Thereafter, and as indicated by the decision block 126, a selection is made, based upon the operating parameter determined at the block 116 and of the previously-obtained quick-paging bit, of what action should be taken by the mobile station. If the operating parameter indicates good operating conditions, selection of operation of the mobile station is made based upon the value of the single paging bit. If the value of the single paging bit indicates that a paging message shall be transmitted on the paging channel during a subsequent paging channel slot, a branch is taken to the block 128, and the mobile station is caused to monitor the paging channel slot assigned to the mobile station and to decode a message when generated thereon. And, if the value of the single paging bit indicates there not to be a forthcoming message broadcast on a subsequent paging channel slot, a branch is taken to the block 132 and the mobile station is permitted to be powered-down. If, conversely, the operating conditions indicate that evaluation should be made of a second paging bit of a pair of page indication bits, a branch is taken to the block 134 whereat the mobile station is caused to monitor the quick-paging channel to determine the value of a second paging bit.

Thereafter, and as indicated by the selection block 136, selection is made of further operation of the mobile station responsive to values of both the first and second page indication bits including whether to perform soft combining operations. Selection is made either to take the yes branch to the block 138 or the no branch to the block 142. At the block 138, the mobile station is caused to monitor a subsequent paging channel slot and to decode a paging message broadcast thereon. Conversely, at the block 142, the mobile station is permitted to power-down and not monitor the subsequent paging channel slot.

Figure 5:
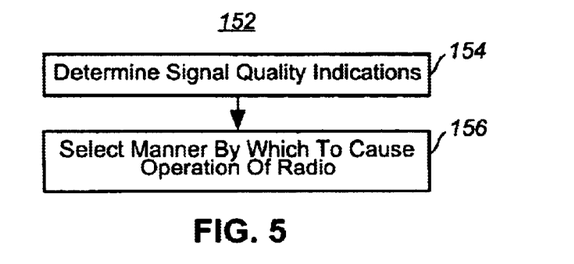
FIG. 5 illustrates a method flow diagram listing the method steps of the method of operation of an embodiment of the present invention.

FIG. 5 illustrates a method, shown generally at 152, of an embodiment of the present invention. The method is for operating a radio device in a selected manner to receive paging methods selectively broadcast to the radio device upon a paging channel slot assigned to the radio device. The radio device further receives page indication bits transmitted at time intervals corresponding to the paging channel slot. The page indication bits are of values representative of transmission of a paging message upon the paging channel slot.

First, and as indicated by the block 154, the signal quality levels of the page indication bits responsive to indications of an operating parameter of signal condition related to transmission of the page indication bits are determined. Then, and as indicated by the block 156, the selected manner by which to operate the radio device to receive the paging message responsive to determinations of the signal quality levels are selected.

Thereby, a dynamic manner by which to cause operation of the radio device to receive paging messages is provided. As operating conditions in which the radio device is operated change, changes are made to the manner by which the radio device is operated to receive paging messages. Improved power consumption characteristics, as well as improved reliability of operation of the radio device, is provided.

The previous descriptions are of preferred examples for implementing the invention, and the scope of the invention should not necessarily be limited by this description. The scope of the present invention is defined by the following claims.

I claim:

1. In a radio device operable in a radio communication system in which paging messages are selectively transmitted to the radio device upon a paging channel slot assigned to the radio device, the paging channel slot defined upon a paging channel, and in which page indication bits are transmitted to the radio device at time intervals corresponding to the paging channel slot, the page indication bits of values representative of transmission of a paging message upon the paging channel slot, an improvement of apparatus for operating the radio device in a selected manner to receive the paging messages, said apparatus comprising:

a determiner coupled to receive indications of an operating parameter of conditions related to transmission of the page indication bits to the radio device, said determiner for determining a representation of the operating parameter responsive to the indications received thereat;

a selector coupled to receive indications of determinations made by said determiner, said selector operable responsive to the indications of the determinations made by said determiner for selecting the selected manner by which to operate the radio device to receive the paging message, wherein the selected manner by which said selector selects the radio device to be operated to receive the paging messages comprises a manner by which selection whether to decode a paging message is made responsive to detection of one paging bit of at least a pair of page indication bits to be of a selected value; and wherein the radio communication system includes a network infrastructure including a number of broadcasting stations positioned in a selected proximity to the radio device and to which the radio device tunes to each of the number of broadcasting stations during operation of the radio device and wherein the indications of the operating parameter to which said determiner is coupled to receive comprise indications of the number of broadcasting stations positioned within the selected proximity to the radio device.

2. The apparatus of claim 1 wherein the indications of the operating parameter to which said determiner is coupled to receive comprises indications of received signal levels of signals received at the radio device.

3. The apparatus of claim 1 wherein a pilot signal is broadcast during operation of the radio communication system and wherein the indications of the operating parameter to which said determiner is coupled to receive comprises indications of values of Ec/Io of the pilot signal when received at the radio device.

4. The apparatus of claim 1 wherein the radio device is moveable and wherein the indications of the operating parameter to which said determiner is coupled to receive comprise indications of speeds at which the radio device is moved.

5. The apparatus of claim 1 wherein the radio device is provided with operative power to power component portions of the radio device and wherein the indications of the operating parameter to which said determiner is coupled to receive comprises indications of levels of power consumed by at least a selected component portion of the radio device.

6. The apparatus of claim 1 wherein the selected manner by which said selector selects the radio device to be operated to receive the paging messages comprises a manner by which selection whether to decode the paging message is made responsive to detection of a combination of a first paging bit and at least a second paging bit of at least a pair of page indication bits to be of selected values.

7. The apparatus of claim 1 wherein the radio device is powered-up pursuant to a power-up schedule and wherein the operating parameter responsive to which said determiner makes the determinations comprises the power-up schedule.

8. The apparatus of claim 1 wherein the radio device maintains a history of missed-pages during prior operation and wherein the operating parameter responsive to which said determiner makes die determinations comprises the history of the missed pages.

9. The apparatus of claim 1 wherein the radio communication system comprises a radio base station for sending system condition information to the radio device and wherein the indications of the operating parameter responsive to which said determiner makes the determinations comprises the system condition information.

10. The apparatus of claim 1 wherein the selected manner by which said selector selects the radio device to be operated to receive the paging messages comprises a manner by which selection whether to decode the paging message is made responsive to detection of a second paging bit of a pair of page indication bits to be of a selected value.

11. The apparatus of claim 1 wherein the selected manner by which said selector selects the radio device to be operated to receive the paging messages comprises a manner by which selection is made to decode a paging message irrespective of values of the page indication bits.

12. The apparatus of claim 11 wherein the selected manner comprises a manner which the selection is made without detecting values of the page indication bits.

13. The apparatus of claim 1 wherein the radio device includes a soft combiner and wherein the selected manner by which said selector selects the radio device to be operated to receive the paging messages comprises a manner by which selection whether to decode a paging message is made responsive to soft-combined values formed by the soft combining of all paging indication bits.

14. The apparatus of claim 1 wherein the radio communication system comprises a cellular communication system wherein the radio device comprises a mobile station, wherein network infrastructure broadcasts paging signals to the mobile station, and wherein said determiner receives the indications of the operating parameter to determine a likelihood of the accuracy of values of the page indication bits when received at the mobile station.

15. The apparatus of claim 14 wherein said selector selects the manner by which to operate the mobile station to receive the paging message responsive to a value of at least one paging bit when said determiner determines the accuracy of the page indication bits likely to be valid.

16. A method for operating a radio device in a selected manner to receive paging messages selectively broadcast to the radio device upon a paging channel slot assigned thereto and defined upon a paging channel in a radio communication system, the radio device further for receiving page indication bits transmitted at time intervals corresponding to the paging channel slot, the page indication bits of values representative of transmission of a paging message upon the paging channel slot, said method comprising:

determining signal quality levels of the page indication bits responsive to indications of an operating parameter, said operating parameter comprising indications of a number of broadcasting stations positioned within a selected proximity to the radio device, to each of which broadcasting stations the radio device tunes during operation of the radio device; and selecting the selected manner by which to operate the radio device to receive the paging message responsive to determinations made during said operation of determining and to whether one paging bit of at least a pair of page indication bits is a selected value.

17. The method of claim 16 comprising the additional operation of decoding the paging message when broadcast upon the paging channel slot and received at the radio device.

18. The method of claim 16 wherein said operation of determining comprises determining a likelihood of accuracy of values of the page indication bits when received at the radio device.

19. The method of claim 18 wherein said operation of selecting comprises selecting operation of the radio device to receive the paging message responsive to a value of at least one paging bit responsive to a determination during said operation of determining of the accuracy of the page indication bits likely to be valid.

20. The method of claim 18 wherein said operation of selecting comprises selecting operation of the radio device to receive the paging message irrespective of a value of a paging bit responsive to a determination during said operation of determining of the accuracy of the page indication bits unlikely to be valid.

21. Apparatus for operating a mobile station in a selected manner to receive paging messages broadcast upon a paging channel slot defined upon a paging channel of a cdma2000 cellular communication system, the mobile station further receiving page indication bits transmitted at time intervals corresponding to the paging channel slot, the page indication bits of values representative of transmission of a paging message upon the paging channel slot, said apparatus comprising:

a determiner coupled to receive indications of an operating parameter related to the page indication bits transmittable to the mobile station, said determiner for determining a representation of the operating parameter responsive to the indications received thereat; and     a selector coupled to receive indications of determinations made by said determiner, said selector, operable responsive to the indications of the determinations made by said determiner, for selecting the selected manner by which to operate the mobile station to receive the paging message, wherein the selected manner by which said selector selects the radio device to be operated to receive the paging, messages comprises a manner by which selection whether to decode a paging message is made responsive to detection of one paging bit of at least a pair of page indication bits to be of a selected value; and wherein the radio communication system includes a network infrastructure including a number of broadcasting stations positioned in a selected proximity to the radio device and to which the radio device tunes to each of the number of broadcasting stations during operation of the radio device and wherein the indications of the operating parameter to which said determiner is coupled to receive comprise indications of the number of broadcasting stations positioned within the selected proximity to the radio device.

* * * * *